United States Patent
Irmer et al.

(10) Patent No.: US 7,127,939 B2
(45) Date of Patent: Oct. 31, 2006

(54) MEASURING METHOD ON AN ELECTRIC MOTOR AND MEASURING DEVICE FOR AN ELECTRIC MOTOR FOR DETERMINING THE FLY HEIGHT AND/OR AXIAL PLAY

(75) Inventors: Norbert Irmer, Villingen-Schwenningen (DE); Carsten Etling, Spaichingen (DE); Guido Schmid, Triberg (DE)

(73) Assignee: Minetea Co., Ltd., Miyota-machi (JP)

( * ) Notice: Subject to any disclaimer, the term of this patent is extended or adjusted under 35 U.S.C. 154(b) by 185 days.

(21) Appl. No.: 10/820,329

(22) Filed: Apr. 7, 2004

(65) Prior Publication Data

US 2004/0200270 A1    Oct. 14, 2004

(30) Foreign Application Priority Data

Apr. 12, 2003   (DE)   ................ 103 16 940

(51) Int. Cl.
*G01B 21/16*   (2006.01)
*H02K 11/00*   (2006.01)

(52) U.S. Cl. ...................................... 73/116
(58) Field of Classification Search ............. 73/865.9, 73/116, 119 R; 318/490
See application file for complete search history.

(56) References Cited

U.S. PATENT DOCUMENTS

| | | | | |
|---|---|---|---|---|
| 1,823,310 A | * | 9/1931 | Allen | 415/48 |
| 3,190,125 A | * | 6/1965 | Holz | 73/865.9 |
| 3,709,245 A | * | 1/1973 | O'Connor, Jr. | 251/127 |
| 4,078,185 A | * | 3/1978 | Singbartl | 310/168 |
| 4,179,075 A | * | 12/1979 | Rachais | 241/67 |
| 5,920,198 A | * | 7/1999 | Suzuki et al. | 324/662 |
| 5,926,001 A | * | 7/1999 | Eguchi | 318/647 |
| 6,173,234 B1 | | 1/2001 | Lee | 702/50 |
| 6,532,791 B1 | * | 3/2003 | Schmid et al. | 73/865.9 X |

FOREIGN PATENT DOCUMENTS

| | | | | |
|---|---|---|---|---|
| DE | 199 50 463 | | 5/2001 | |
| EP | 1 134 875 | | 9/2001 | |
| JP | 59081532 A | * | 5/1984 | 33/501 |
| SU | 892257 B | * | 12/1981 | |

* cited by examiner

*Primary Examiner*—Thomas P. Noland
(74) *Attorney, Agent, or Firm*—Lipsitz & McAllister, LLC

(57) ABSTRACT

To provide a measuring method on an electric motor with a rotor and a stator for determining the fly height and/or axial play, the rotor being mounted, and in particular fluid-mounted, on the stator, with which method the axial position of the rotor in relation to the stator can be determined with high levels of accuracy and reproducibility, it is provided that the electric motor is operated at a defined measuring speed, at which the rotor is in a specific axial position in relation to the stator, with this relative axial position being determined in that the rotor is brought in a defined manner, with the motor at a standstill, into a first stop position in relation to the stator, in that the rotor is brought in a defined manner, with the motor at a standstill, into a second stop position in relation to the stator, lying opposite the first stop position, and in that the relative axial position between the rotor and the stator is respectively measured in the two stop positions.

23 Claims, 3 Drawing Sheets

MEASURING METHOD ON AN ELECTRIC MOTOR AND MEASURING DEVICE FOR AN ELECTRIC MOTOR FOR DETERMINING THE FLY HEIGHT AND/OR AXIAL PLAY

The present disclosure relates to the subject matter disclosed in German application No. 103 16 940.7 of Apr. 12, 2003, which is incorporated herein by reference in its entirety and for all purposes.

BACKGROUND OF THE INVENTION

The invention relates to a measuring method on an electric motor with a rotor and a stator for determining the fly height (lifted height) and/or axial play, the rotor being mounted, and in particular fluid-mounted, on the stator.

The invention also relates to a measuring device for an electric motor, by means of which an axial position of a rotor which is mounted, and in particular fluid-mounted, on a stator can be determined.

Fluid bearings or hydrodynamic bearings are used for example for the rotational mounting of spindle motors for hard disk drives. Such electric motors have high levels of running smoothness and accuracy along with great robustness and shock resistance. However, it is important when producing a fluid bearing that very close tolerances are maintained for the bearing gap between the shaft and the bearing mount. If, for example, the motor is operated at its nominal speed, then the rotor is in a specific relative axial position (lifted position or flying position) in relation to the stator. The associated fly height or lifted height along with the axial play characterizes the electric motor, and in particular is a measure of the quality of the electric motor.

Ball bearings also have axial play.

SUMMARY OF THE INVENTION

In accordance with the present invention, a measuring method and a measuring device is provided with which the axial position of the rotor in relation to the stator can be determined with high levels of accuracy and reproducibility.

This is achieved in accordance with the invention by operating the electric motor at a defined measuring speed, at which the rotor is in a specific axial position in relation to the stator, with this relative axial position being determined, by bringing the rotor in a defined manner, with the motor at a standstill, into a first stop position in relation to the stator, by bringing the rotor in a defined manner, with the motor at a standstill, into a second stop position in relation to the stator, lying opposite the first stop position, and by respectively measuring the relative axial position between the rotor and the stator in the two stop positions.

The procedure according to the invention allows subjective influences when the stop positions are being established to be eliminated, since they are established in a defined manner. When the stop positions are known, the fly height can once again be determined with a high level of accuracy. The measuring method according to the invention allows the fly height and at the same time also the axial play to be determined with high levels of accuracy and reproducibility. The relevant variables can be determined within short measuring cycles. In particular, the measurement can be automated.

The measuring speed advantageously corresponds substantially to the nominal speed of the electric motor. The nominal speed of the electric motor is that speed for which the electric motor is optimized. If the measuring speed corresponds to the nominal speed, the lifted height and the axial play can indeed be determined for the nominal speed by the measuring method according to the invention.

The positional measurement can be carried out in a simple way by means of a distance sensor (position sensor). It may be, for example, a capacitive sensor. Other contactless sensors, such as inductive sensors, optical sensors or possibly magnetic sensors or ultrasound sensors can also be used. In particular, in this case the stator is kept fixed in place and the relative axial position between the stator and the rotor is measured. For this purpose, a fixed distance sensor is provided in particular. Changes in the relative position between the stator and the rotor can be sensed by means of the distance sensor.

It is particularly advantageous if the rotor is pressed against the sensor to set the corresponding stop position. By determining this stop position, the fly height and the axial play can then be determined by means of the signal of the corresponding distance sensor.

The corresponding stop position can be reached in a defined manner if the pressing of the rotor against the stator takes place by means of compressed air. As a result, the pressing process can be controlled and so the corresponding stop position can be reached in a defined manner.

In particular, it may be provided that compressed air pulses are used for pressing the rotor against the stator. It has proven to be advantageous if fewer than ten pulses per minute are used to set the corresponding stop position.

To set the further stop position, it is advantageous if the rotor is pulled away from the stator. This takes place for example by means of applying negative pressure.

For this purpose, a pressure bell may be provided, by means of which a negative pressure appropriate for pulling the rotor away from the stator can be exerted on said rotor.

It is most particularly advantageous in this respect if the pressure bell is cardanically suspended (suspended on gimbals), in order to minimize its influence on the measuring result.

High precision in the determination of the lifted height and the axial play can be achieved if the deformation of part of the electric motor to which force is applied in the stop positions is measured. In the stop positions, parts rest against one another with force applied, so that they exert a force on one another. This force is manifested by a deformation, which is also measured by the distance sensor or is determined by a further sensor. The values supplied by the distance sensor must be corrected to allow for the deformation, since there is no such deformation during the operation of the electric motor, when the rotor is at its fly height above the stator. The measurement of the deformation allows such a correction to be carried out.

In this respect, a distance sensor for measuring the deformation is provided in particular. This distance sensor is in this case aligned with the stator, to allow corresponding deformations to be measured.

The deformation/distance sensor is advantageously aligned coaxially in relation to a central axis of a shaft of the electric motor or is disposed in relation to the latter at such a distance that its field of view lies in a projection of the stop face in a bearing mount for the shaft. This allows the deformation to be determined in a simple way, that is to say by means of a change in the distance between the stator and the distance sensor.

In particular, the deformation/distance sensor is in this case aligned with a base plate of the stator.

A field of view of the deformation/distance sensor in this case lies in the opposite direction to a field of view of a distance sensor for determining the relative position between the rotor and the stator. The distance sensor for determining the relative position between the rotor and the stator measures (in a relative way) the lifted height of the rotor in relation to the stator. The deformation/distance sensor measures the deformation of, in particular, a base plate of the electric motor.

In the determination of the lifted height and/or the axial play of the rotor by means of the stop position or stop positions, the deformation of the stop faces caused by a force being applied is then taken into account. This allows the lifted height and the fly height of the rotor in relation to the stator to be determined with high levels of accuracy and reproducibility, even in the case of orders of magnitude of 10 µm and less.

In particular, it is provided that at first the electric motor is operated at a specific measuring speed, then, with the motor at a standstill, the rotor is pulled away from the stator to set the first stop position, and subsequently the rotor is pressed against the stator to set the second stop position, or the rotor is first pressed against the stator and then the rotor is pulled away from the stator. In the case of such a measuring method according to the invention, the lifted height and the axial play can be determined with a high level of reproducibility, low cycle times and a high level of accuracy. In particular, such a measuring method can be carried out automatically.

In accordance with the invention, the measuring device comprises a pushing and pulling device by means of which the rotor and the stator can be brought in a defined manner into a first axial position in relation to each other, in which the rotor lies in a first stop position in relation to the stator, and can be brought into a second stop position, in which the rotor lies in an opposite, second stop position in relation to the stator.

The pushing and pulling device can be used to set both stop positions in a defined manner in a measuring device. The lifted height (fly height) and axial play of the rotor in relation to the stator can then be determined with high levels of accuracy and reproducibility.

In particular, in this case the pushing and pulling device can be operated in a pulsed manner, to make it possible to ensure that the stop positions are reached in a controlled, defined manner.

In particular, the pushing and pulling device can be used to apply compressed air and negative pressure to the electric motor, to allow a pressing pressure and a pulling force to be produced in this way.

For example, the pushing and pulling device comprises a pressure bell for pulling the rotor away from the stator. Furthermore, a pressure cylinder may be provided for establishing a pressing force of the rotor against the stator.

In particular, the pushing and pulling device is cardanically suspended, in order to minimize its influence on the measuring result.

Furthermore, it is provided that a distance sensor is provided for determining the relative axial position between the stator and the rotor, since the relative axial position can then be determined in a simple way as distance information. In particular, in this case the distance sensor is fixedly positioned, in order to obtain distance information in this way.

Furthermore, it is advantageous if a deformation sensor is provided for determining the deformation of a region of the electric motor to which force is applied by means of the pushing and pulling device, the deformation sensor in particular comprising a distance sensor or being formed by such a distance sensor.

The deformation sensor is also preferably fixedly positioned, in order in this way to allow deformations to be accurately sensed as distance information.

Further advantageous configurations of the measuring device according to the invention have been explained in connection with the measuring method according to the invention.

The description which follows of a preferred embodiment serves in connection with the drawing for a more detailed explanation of the invention.

DETAILED DESCRIPTION OF THE INVENTION

Figure 1:
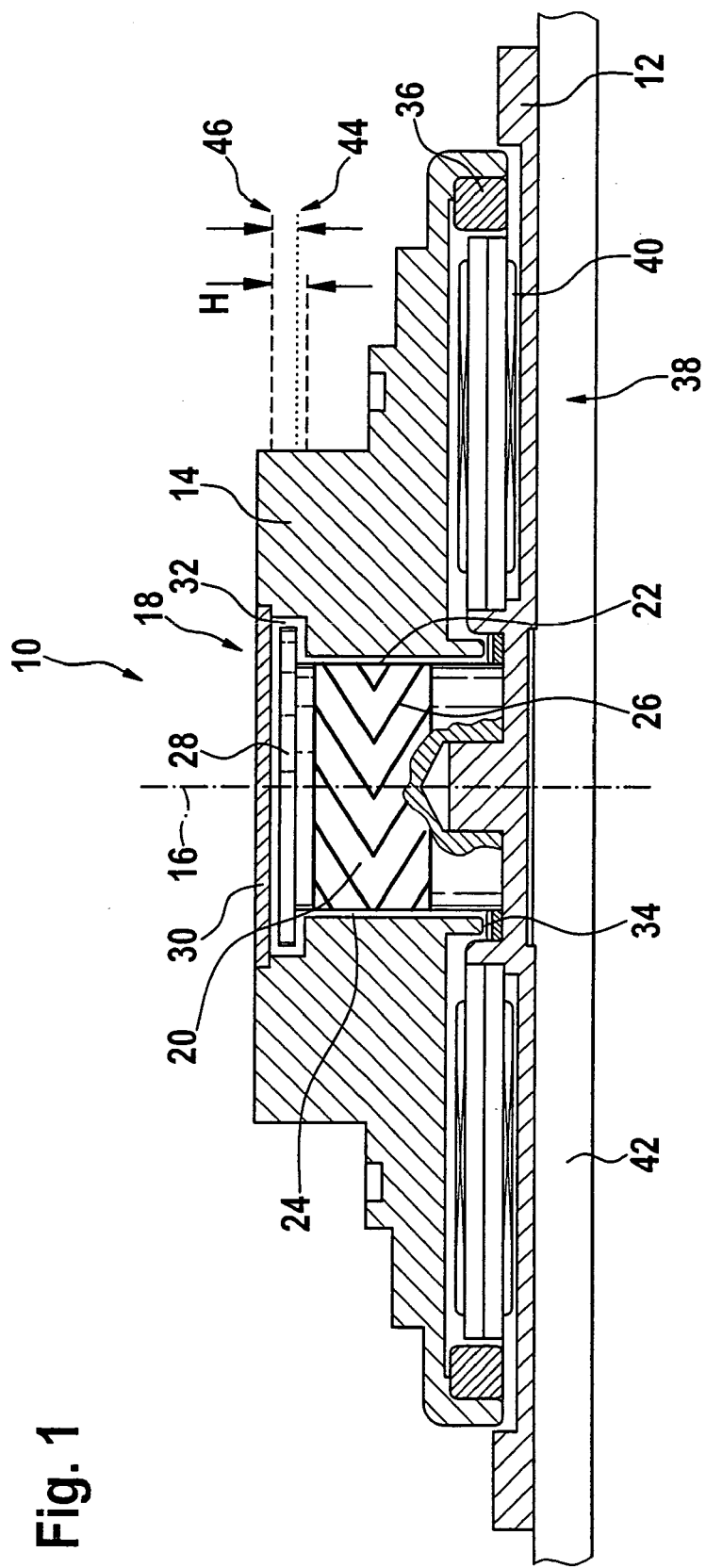
FIG. 1 shows a schematic sectional view of an exemplary embodiment of an electric motor (spindle motor) with a fluid-mounted rotor.

An exemplary embodiment of an electric motor, which has a fluid-mounted shaft, is schematically shown in FIG. 1 and designated there as a whole by 10. This electric motor 10 has a stator 12 and a rotor 14. The rotor 14 is mounted rotatably with respect to the stator 12 about an axis 16.

For mounting the rotor 14 on the stator 12, a fluid bearing 18 (hydrodynamic bearing) is provided. In the case of the exemplary embodiment shown in FIG. 1, the fluid bearing 18 comprises a shaft 20, which is seated in a rotationally fixed manner on the stator 12. However, it may also be provided that the shaft is seated in a rotationally fixed manner on the rotor 14 (not shown in the drawing). The shaft 20 is accommodated in a bearing mount 22 (bearing sleeve) of the rotor 14. Formed between the bearing mount 22 and the shaft 20 is a bearing gap 24, which is filled with a lubricant to achieve a hydrodynamic lubrication.

The shaft 20 has a structure 26 for imparting turbulence to the lubricant when the rotor 14 rotates about the axis of rotation 16. A corresponding structure may alternatively or additionally be formed on the bearing mount 22, facing the shaft 20.

The shaft 20 comprises a thrust plate 28, which is seated at the end of the shaft 20 remote from the stator 12. This thrust plate 28 has in relation to the axis of rotation 16, which coincides with a central axis of the shaft 20, a greater cross-section than the shaft 20 below this thrust plate 28.

Facing the thrust plate 28, the bearing mount 22 is delimited by a counter plate 30, this counter plate 30 being formed in particular as a disk. The bearing mount 22 comprises a first region 32, in which the thrust plate 28 is guided, and a second region 34, which follows the first region 32 and in which the portion of the shaft 20 below the thrust plate 28 is guided. The first region 32 has a greater cross-section than the second region 34 of the bearing mount 22. The height of the second region 34 parallel to the axis 16 is greater than the corresponding height of the first region 32. The first region 32 has the form of a hollow disk, while the second region 34 has the form of a hollow cylinder.

Held on the rotor 14 is a magnet 36 or a number of corresponding magnets, which face a magnetic field generating device 38 of the stator 12. This magnetic field generating device 38 comprises windings 40.

The stator 12 itself has a base plate 42.

The first region 32 of the bearing mount 22, in which the thrust plate 28 is mounted, has a height H, which is greater than the corresponding height of the thrust plate 28. This defines a first stop position 44, in which the side of the thrust plate 28 facing the stator 12 butts in its annular region against the delimiting wall of the first region 32 facing the counter plate 30, this delimiting region likewise being annular.

A second stop position 46 is defined by the surface of the thrust plate 28 that is facing the counter plate 30 and is circular, butting against the counter plate 30.

The difference in height between the first stop position 44 and the second stop position 46 is also referred to as the axial play of the electric motor. In the case of spindle motors which are used in hard disk drives, the value of the axial play is of the order of magnitude of 10 μm.

When the rotor 14 rotates about the axis of rotation 16, it lifts itself from the stator 12, i.e. the thrust plate 28 is located in a position between the first stop position 44 and the second stop position 46. The rotor 14 is thereby displaced in relation to the stator 12 (in the case of the exemplary embodiment according to FIG. 1 then also in relation to the shaft 20) in axial height parallel to the axis 16, or there is a relative displacement between the rotor 14 and the stator 12 and consequently a relative displacement of the shaft 20 in the bearing mount 22. This position of the rotor 14 above the stator 12 is also referred to as the fly height or lifted height. This fly height at the nominal speed of the electric motor is a characteristic measure of the electric motor 10 and characterizes in particular the quality of the electric motor.

Figure 2:
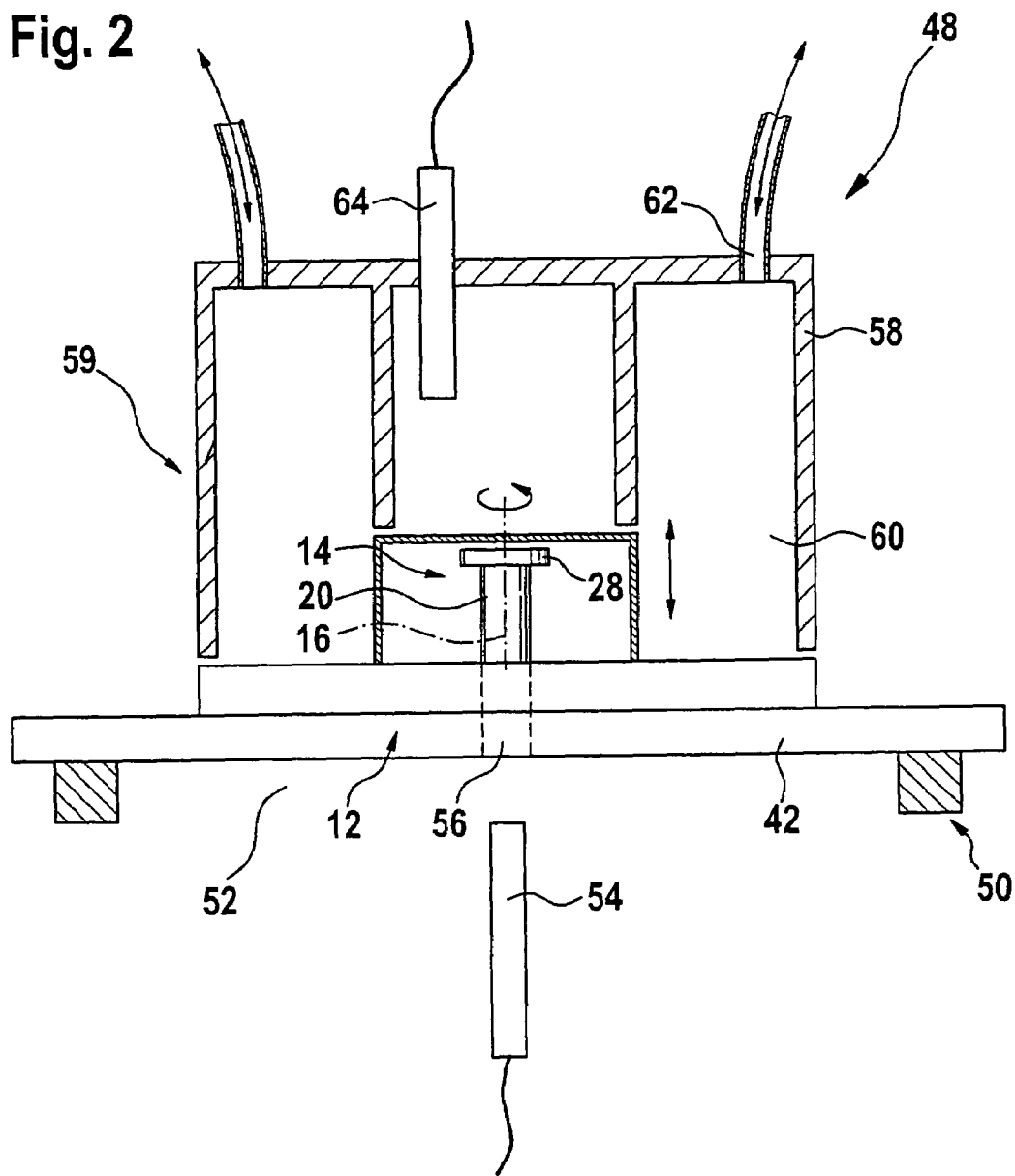
FIG. 2 shows a schematic representation of an exemplary embodiment of a measuring device according to the invention, with which the lifted height of the rotor in relation to the stator can be determined.

The present invention provides a method and a device for measuring this fly height:

An exemplary embodiment of a measuring device according to the invention for determining the axial position between the stator 12 and the rotor 14 during rotation of the motor, which is shown in FIG. 2 and designated there as a whole by 48, comprises a holding device 50, on which the stator 12 can be fixed. The holding device 50 is in this case formed in such a way that it leaves free a region 52 below the base plate 42, which region is coaxial in relation to the axis of rotation 16. Disposed in this region 52 is a deformation sensor 54, by means of which the deformation of the base plate 42 in the region of a projection 56 of the shaft 20 onto the base plate 42 can be determined. As described in still more detail below, this deformation sensor 54 allows corrections to be carried out with respect to the determination of the fly height and the axial play of the rotor 14 on the basis of a deformation of the base plate 42.

The deformation sensor 54 is, in particular, a distance sensor, such as for example a capacitive sensor, which is fixedly disposed with respect to the holding device 50 and with its field of view is aligned with the projection 56.

To determine the axial play, the rotor 14 is brought in a defined manner into the first stop position 44 and into the second stop position 46. This preferably takes place in a controlled manner by means of applying negative pressure and compressed air by a pushing and pulling device 59. Provided for this purpose is a cardanically suspended pressure bell 58, by means of which a pressure can be exerted on the rotor 14 by means of compressed air from a pressure cylinder, in order to press said rotor against the stator 12 and consequently reach the second stop position 46 of the rotor 14 in relation to the stator 12. Furthermore, the pressure bell 58 can be used to apply negative pressure to the rotor 14, in order to pull the latter away from the stator 12 and consequently reach the first stop position 44.

The pressure bell 58 comprises an annular chamber 60, which can be positioned with a front end on the rotor 14, to allow a force to be exerted on said rotor in relation to the stator 12. This chamber 60 is provided with connections 62, via which compressed air can be introduced into the chamber 60 or a negative pressure can be created in the chamber 60.

To allow the axial position of the rotor 14 in relation to the stator 12 to be measured, and consequently the axial position of the shaft 20 in the bearing mount 22, a distance sensor 64 which is positioned fixedly with respect to the holding device 50 and the field of view of which is aligned with a surface of the rotor 14 is provided. An axial displacement of the rotor 14 in relation to the stator 12 is then manifested by a relative axial displacement of the rotor 14 with respect to the distance sensor 64, so that this displacement can be measured.

Figure 3:
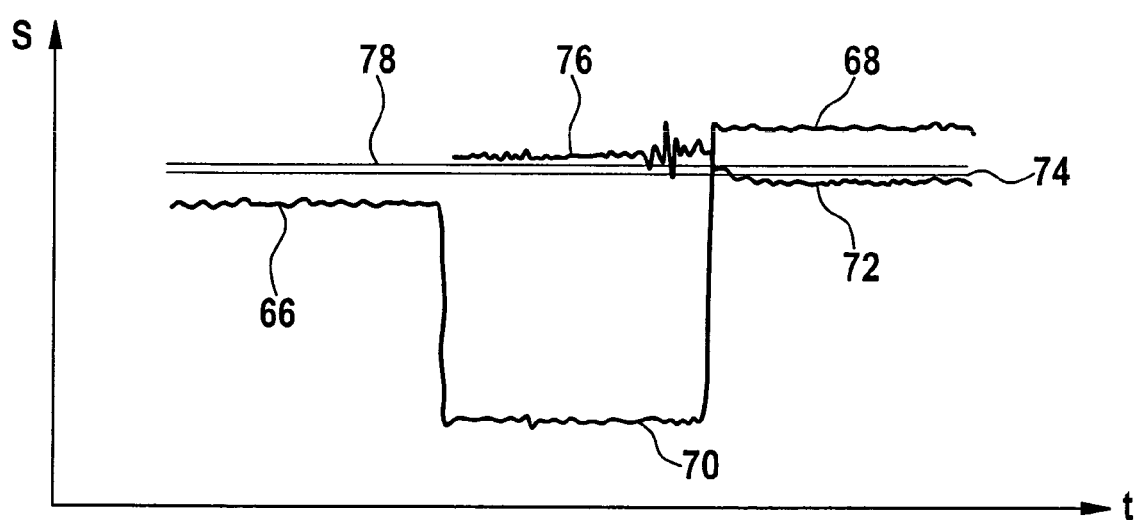
FIG. 3 shows an example of measuring signals, from which the lifted height (fly height) and the axial play can be determined.

According to the invention, the following procedure is then followed:

The electric motor 10 is operated at a measuring speed which preferably corresponds to its nominal speed, without force being exerted. This then establishes a specific lifted position of the rotor 14 in relation to the stator 12, which characterizes the electric motor 10. The distance sensor 64 measures a signal 66 (FIG. 3), which is a measure of this fly height or lifted height.

Subsequently, the rotor 14 is pulled into the first stop position 44, i.e. the rotor 14 is positioned such that the thrust plate 28 rests against a delimiting wall of the first region 32 of the bearing mount 22. When this first stop position 44 is established, the rotor 14 is not rotating, i.e. the electric motor 10 is in a non-operating state. The transfer into the first stop position 44 takes place in a defined way.

By applying negative pressure, the rotor 14 is lifted from the stator 12 in a defined manner, and the rotor 14 is pulled into the first stop position 44. This transfer is carried out with the electric motor 10 at a standstill. It may be provided that the application of the negative pressure takes place in a pulsed manner.

The distance sensor 64 then supplies a signal 68, which is characteristic of the first stop position 44.

Subsequently—possibly after venting of the chamber 60—compressed air is introduced into the chamber 60 in a pulsed manner. It has proven to be advantageous if six to seven surges of air per minute are used to reach the second stop position 46. The distance sensor 64 supplies a signal 70, which is characteristic of the second stop position 46.

The sequence of the transfer into the first stop position 44 and second stop position 46 may also be reversed.

The axial play can be determined from the difference between the signals 68 and 70, which are distance signals. The signals 68 and 70, which are measured with the electric motor 10 at a standstill, characterize the two limiting cases of the axial position of the rotor 14 in relation to the stator 12.

On the basis of the signals 68 and 70, the fly height of the rotor 14 in relation to the stator 12 can then be determined from the signal 66, in order in this way to characterize the electric motor 10.

When force is applied to the shaft 20 via the rotor 14, this is manifested by an elastic deformation of the shaft 20 or the base plate 42. This elastic deformation is contained in the signals 66, 68, 70 of the distance sensor 64, but does not contribute to the axial play and the fly height. The measuring results must therefore be corrected to allow for the deformation; the deformation sensor 54 provides signals which contain information on the deformation and, as a result, can serve for such a correction.

In the first stop position 44, by pulling up the rotor 14 in relation to the stator 12, a force can be exerted on the shaft 20 in the pulling-up direction. As a result, the base plate 42 is deformed in the same direction, so that the distance between the deformation sensor 54 and the base plate 42 is increased at least in the region of the projection 56. The deformation sensor 54 consequently supplies a signal 72 with a signal distance from a normal line 74; the difference from the normal line 74 shows an increase in the distance between the deformation sensor 54 and the base plate 42. The signal 68 must be correspondingly corrected to obtain the first stop position 44 with a high level of accuracy.

If, conversely, the second stop position 46 is held, in that the rotor 14 is pressed against the stator 12, a force is then exerted on the shaft 20 in the direction of the pressure. This is manifested by a deformation of the base plate 42 in this direction. As a result once again, the distance between the base plate 42 and the deformation sensor 54, at least in the region of the projection 56, is reduced, which is manifested by a corresponding signal 76, which is at a distance from a normal line 78. By correction of the second signal 70 to allow for the distance of the signal 76 from the normal line 78, the second stop position 46 can then be determined with high precision.

The correction by means of the signals 72, 76 of the deformation sensor 54 allows the first stop position 44 and the second stop position 46 to be determined with high precision, in order once again to be able to determine the fly height and the axial play in this way.

The device according to the invention can be used to determine the fly height of the shaft 20 in the bearing mount 22 by means of the method according to the invention in a highly precise and defined manner, it even being possible to determine fly heights of the order of magnitude of 10 µm and less. The measuring device 48 can be used to determine both the fly height and the axial play; the measurements have high levels of reproducibility and accuracy, and short measuring cycle times.

The measuring method according to the invention was described above in connection with a fluid-mounted rotor. It can be used for ball-mounted rotors.

LIST OF DESIGNATIONS

10 electric motor
12 stator
14 rotor
16 axis
18 fluid bearing
20 shaft
22 bearing mount
24 bearing gap
26 structure
28 thrust plate
30 counter plate
32 first region
34 second region
36 magnet
38 magnetic field generating device
40 winding
42 base plate
44 first stop position
46 second stop position
48 measuring device
50 holding device
52 region
54 deformation sensor
56 projection
58 pressure bell
59 pushing and pulling device
60 chamber
62 connection
64 distance sensor
66 signal
68 signal
70 signal
72 signal
74 normal line
76 signal
78 normal line

The invention claimed is:

1. Measuring method on an electric motor with a rotor and a stator for determining the fly height and/or axial play, the rotor being mounted on the stator, comprising:

operating the electric motor at a defined measuring speed, at which the rotor is in a specific axial position in relation to the stator, and determining this relative axial position;

bringing the rotor in a defined manner, with the motor at a standstill, into a first stop position in relation to the stator;

bringing the rotor in a defined manner, with the motor at a standstill, into a second stop position in relation to the stator, lying opposite the first stop position; and respectively measuring the relative axial position between the rotor and the stator in the two stop positions.

2. Measuring method according to claim 1, wherein the measuring speed corresponds essentially to the nominal speed of the electric motor.

3. Measuring method according to claim 1, wherein the positional measurement takes place by means of one or more distance sensors.

4. Measuring method according to claim 1, wherein the stator is kept fixed in place and the relative axial position between the stator and the rotor is measured.

5. Measuring method according to claim 4, wherein a fixed distance sensor is provided for measuring the relative axial position between the stator and the rotor.

6. Measuring method according to claim 1, wherein the rotor is pressed against the stator to set the corresponding stop position.

7. Measuring method according to claim 6, wherein the pressing of the rotor against the stator takes place by means of compressed air.

8. Measuring method according to claim 7, wherein air pulses are used for pressing the rotor against the stator.

9. Measuring method according to claim 8, wherein fewer than ten pulses per minute are used.

10. Measuring method according to claim 1, wherein the rotor is pulled away from the stator to set the corresponding stop position.

11. Measuring method according to claim 10, wherein the rotor is pulled away from the stator by applying negative pressure.

12. Measuring method according to claim 10, wherein the rotor is pulled away from the stator by means of a pressure bell.

13. Measuring method according to claim 12, wherein the pressure bell is cardanically suspended.

14. Measuring method according to claim 1, wherein the deformation of a part of the electric motor to which force is applied in the stop positions is measured.

15. Measuring method according to claim 14, wherein a distance sensor for measuring the deformation is provided.

16. Measuring method according to claim 15, wherein the deformation/distance sensor is disposed coaxially in relation to a central axis of a shaft of the electric motor.

17. Measuring method according to claim 15, wherein the deformation/distance sensor is aligned with a base plate of the stator.

18. Measuring method according to claim 15, wherein a field of view of the deformation/distance sensor is in the opposite direction to a field of view of a distance sensor for determining the relative position between the rotor and the stator.

19. Measuring method according to claim 15, wherein the deformation/distance sensor is disposed in relation to a shaft of the electric motor at such a distance that its field of view lies in a projection of a stop face of the shaft in a bearing mount for the shaft.

20. Measuring method according to claim 14, wherein, in the determination of the fly height and/or the axial play of the shaft by means of stop positions, deformation of stop faces caused by force being applied is taken into account.

21. Measuring method according to claim 1, wherein at first the electric motor is operated at a specific measuring speed, then, with the motor at a standstill, the rotor is pulled away from the stator to set the first stop position, and subsequently the rotor is pressed against the stator to set the second stop position.

22. Measuring method according to claim 1, wherein at first the electric motor is operated at a specific measuring speed, then, with the motor at a standstill, the rotor is pressed against the stator to set the second stop position, and subsequently, with the motor at a standstill, the stator is pulled away from the rotor to set the first stop position.

23. Measuring method in accordance with claim 1, wherein said rotor is fluid-mounted on said stator.

* * * * *

UNITED STATES PATENT AND TRADEMARK OFFICE
CERTIFICATE OF CORRECTION

PATENT NO. : 7,127,939 B2 Page 1 of 1
APPLICATION NO. : 10/820329
DATED : October 31, 2006
INVENTOR(S) : Irmer et al.

It is certified that error appears in the above-identified patent and that said Letters Patent is hereby corrected as shown below:

On Title Page, should read
(73) Assignee: Minebea Co., Ltd., Miyota-machi (JP)

Signed and Sealed this

Ninth Day of January, 2007

JON W. DUDAS
*Director of the United States Patent and Trademark Office*